(12) United States Patent
Devulapalli et al.

(10) Patent No.: US 12,373,246 B2
(45) Date of Patent: Jul. 29, 2025

(54) AUTOMATIC UPDATE MANAGEMENT IN A COMPUTING INFRASTRUCTURE

(71) Applicant: Bank of America Corporation, Charlotte, NC (US)

(72) Inventors: Siva Kumar Devulapalli, Hyderabad (IN); Swarup Prakash Kar, Hyderabad (IN); Narsing Raj, Hyderabad (IN); Hitendra Kumar, Ghaziabad (IN)

(73) Assignee: Bank of America Corporation, Charlotte, NC (US)

( * ) Notice: Subject to any disclaimer, the term of this patent is extended or adjusted under 35 U.S.C. 154(b) by 674 days.

(21) Appl. No.: 17/656,167

(22) Filed: Mar. 23, 2022

(65) Prior Publication Data

US 2023/0305886 A1    Sep. 28, 2023

(51) Int. Cl.
G06F 9/48        (2006.01)
G06F 8/65        (2018.01)
G06F 8/656       (2018.01)

(52) U.S. Cl.
CPC ............ *G06F 9/4881* (2013.01); *G06F 8/656* (2018.02)

(58) Field of Classification Search
None
See application file for complete search history.

(56) References Cited

U.S. PATENT DOCUMENTS

| | | | |
|---|---|---|---|
| 6,473,794 B1 | 10/2002 | Guheen et al. | |
| 6,519,571 B1 | 2/2003 | Guheen et al. | |
| 6,536,037 B1 | 3/2003 | Guheen et al. | |
| 6,606,744 B1 | 8/2003 | Mikurak | |
| 6,615,166 B1 | 9/2003 | Guheen et al. | |
| 6,629,081 B1 | 9/2003 | Cornelius et al. | |
| 6,671,818 B1 | 12/2003 | Mikurak | |
| 6,957,186 B1 | 10/2005 | Guheen et al. | |
| 7,069,234 B1 | 6/2006 | Cornelius et al. | |
| 7,124,101 B1 | 10/2006 | Mikurak | |
| 7,149,698 B2 | 12/2006 | Guheen et al. | |
| 7,165,041 B1 | 1/2007 | Guheen et al. | |
| 7,315,826 B1 | 1/2008 | Guheen et al. | |
| 7,467,198 B2 | 12/2008 | Goodman et al. | |
| 7,610,233 B1 | 10/2009 | Leong et al. | |
| 7,647,198 B2 | 1/2010 | Fano et al. | |

(Continued)

FOREIGN PATENT DOCUMENTS

WO    0073929 A2    12/2000

*Primary Examiner* — Mustafa A Amin (57) ABSTRACT

A system includes a computing infrastructure including a plurality of computing nodes and at least one blockchain network including one or more of the computing nodes. The one or more computing nodes of the at least one blockchain network are configured to receive a service request to update a first software application, identify one or more configuration items associated with updating the first software application, determine a set of update activities to be performed to update the first software application, verify the set of update activities, identify at least one user that is to perform the set of update activities, identify whether a conflicting service activity is requested for each configuration item, validate access credentials of the at least one user, and generate at least one file that includes information relating to the update activities, at least one user, configuration items, potential conflicts and verified credentials.

20 Claims, 3 Drawing Sheets

(56) References Cited

U.S. PATENT DOCUMENTS

| | | |
|---|---|---|
| 7,716,077 B1 | 5/2010 | Mikurak |
| 8,121,874 B1 | 2/2012 | Guheen et al. |
| 8,447,722 B1 | 5/2013 | Ahuja et al. |
| 8,495,611 B2 | 7/2013 | Mccarthy et al. |
| 8,560,366 B2 | 10/2013 | Mikurak |
| 9,131,401 B2 | 9/2015 | Panda et al. |
| 9,178,867 B1 | 11/2015 | Letz et al. |
| 9,191,380 B2 | 11/2015 | Anderson et al. |
| 9,277,370 B2 | 3/2016 | Wong et al. |
| 9,311,670 B2 | 4/2016 | Hoffberg |
| 9,313,208 B1 | 4/2016 | Letz et al. |
| 9,432,350 B2 | 8/2016 | Anderson et al. |
| 9,438,599 B1 | 9/2016 | Yuhan et al. |
| 9,734,169 B2 | 8/2017 | Redlich et al. |
| 9,794,797 B2 | 10/2017 | Hoffberg |
| 9,922,345 B2 | 3/2018 | Mikurak |
| 10,152,211 B2 | 12/2018 | Koushik et al. |
| 10,460,331 B2 | 10/2019 | Bishop et al. |
| 10,579,368 B2 * | 3/2020 | Wisnovsky ........... H04L 9/3297 |
| 10,601,959 B2 | 3/2020 | Vadivel et al. |
| 10,620,921 B2 | 4/2020 | Brebner |
| 10,630,501 B2 | 4/2020 | Ansari et al. |
| 10,833,960 B1 | 11/2020 | Ranchal et al. |
| 11,170,316 B2 | 11/2021 | Brown et al. |
| 2012/0066487 A1 | 3/2012 | Brown et al. |
| 2012/0265879 A1 | 10/2012 | Casebolt et al. |
| 2013/0151190 A1 * | 6/2013 | Platt .................... H01J 49/0009 |
| | | 250/252.1 |
| 2016/0062758 A1 * | 3/2016 | Narayanan ................ G06F 8/65 |
| | | 717/172 |
| 2016/0224951 A1 | 8/2016 | Hoffberg |
| 2017/0141968 A1 * | 5/2017 | Lloyd .................... H04L 67/55 |
| 2018/0260212 A1 * | 9/2018 | Wisnovsky ........... G06F 16/134 |
| 2022/0284011 A1 * | 9/2022 | Qian ................... G06F 16/2343 |
| 2023/0009023 A1 * | 1/2023 | Angelo .................... G06F 21/51 |
| 2023/0118880 A1 * | 4/2023 | Gersht ................... G06F 21/53 |
| | | 718/1 |
| 2024/0160755 A1 * | 5/2024 | Shi ....................... G06F 21/606 |

\* cited by examiner

AUTOMATIC UPDATE MANAGEMENT IN A COMPUTING INFRASTRUCTURE

TECHNICAL FIELD

The present disclosure relates generally to data processing, and more specifically to automatic update management in a computing infrastructure.

BACKGROUND

Application and infrastructure stability of a computing infrastructure is of utmost importance to any organization. Software applications running in a computing infrastructure are regularly updated for several reasons including, but not limited to, adding new features and removing outdated ones; repairing security holes and protecting against new security threats; removing computer bugs; improving operating performance; and supporting expansions of the computing infrastructure. The entire end-to-end process for managing updates (e.g., software update) in present computing infrastructures is replete with errors often resulting in high impact incidents. Several problems exist in relation to managing updates in present computing infrastructures including, but not limited to, no end-to-end automated process for pre/post update configuration validation; limited visibility of the impact an update has on upstream and downstream applications/systems; no mechanism to ensure that both pre-requisites and actual update installation take place within an approved time; no controls to detect and fix configuration mismatches/deviations across peer/clustered systems which may have been missed due to oversight; no controls to track business justifications for starting/stopping application updates; no or limited detective controls in existing service management tools and password vaulting solutions to trace and track elevated/privileged logins; and significant time spent in identifying the issue/root cause during triage call and manual intervention at several steps during an update process that leaves the system vulnerable to human errors.

SUMMARY

The system and methods implemented by the system as disclosed in the present disclosure provide technical solutions to the technical problems discussed above by providing end-to-end management of updates to a computing infrastructure automatically, intelligently and in a secure manner. The disclosed system and methods provide several practical applications and technical advantages.

For example, the disclosed system and methods provide the practical application of automatically, intelligently and securely performing end-to-end management of a software update in a computing infrastructure. As described in accordance with embodiments of the present disclosure, in response to receiving a service request to update a software application, the disclosed system and methods identify secondary applications that may be affected by the requested update and may also need to be updated to support the requested update. The system also determines how the secondary applications are to be updated to support the requested update. This provides the technical advantage of helping to ensure that any upstream or downstream applications that are impacted by the requested update are also updated as needed and any errors resulting from the update are avoided.

The disclosed system and methods further automatically verify that the update activities to be performed for each software application are in accordance with the design and/or configuration of the application. For example, the verification may include validating software code that is to be run at a computing node to perform an update activity for a software application. Verifying that updates performed for a software application are in accordance with the design and configuration of the application provides an additional technical advantage of helping to ensure that changes made to a software application do not conflict with the design and configuration of the application.

The disclosed system and methods further automatically identify one or more configuration items that are to be updated in relation to a service request, and for each identified configuration item determine whether a conflicting service activity is requested that can interfere with updating the configuration item. This provides a further technical advantage of identifying conflicting service requests in relation to a configuration item before a requested update is applied, thus avoiding errors and service interruption that may occur as a result of processing conflicting service requests related to the configuration item.

The disclosed system and methods further automatically identify users of the computing infrastructure that can perform a requested update and further verifies validates access credentials and privileges of the identified users using a password vaulting tool that saves access credentials and privileges of uses in the computing infrastructure. Validation of a user and associated update activity includes capturing a justification for performing the update activity by the user and whether the justification for performing the update activity has been approved by appropriate personnel. This provides a further technical advantage of helping to ensure that only users having proper credentials and approved update justifications can perform update activities, thus avoiding unintentional and malicious updates from being performed.

The disclosed system leverages blockchain technology to record each activity related to performing an update. As transactions performed in a blockchain network are immutable, the disclosed system provides a secure mechanism to perform system updates, avoids unauthorized update activities and helps ensure traceability and accountability in the event of an unauthorized and malicious activity.

The disclosed system further records a configuration state of the system or portions thereof before an update is applied and after the update has been applied. This provides a system with a holistic view of pre and post configuration of the systems.

Thus, the systems and methods discussed in accordance with aspects of the present disclosure improve the technology related to infrastructure management including managing updates to a computing infrastructure.

The system of the present disclosure and methods implemented by the system provide an additional technical advantage of improving performance of computing nodes in a computing infrastructure. For example, by identifying applications and systems (e.g., upstream/downstream applications) that can be affected by a requested software update and updating those affected systems and applications as well, the disclosed system and methods avoid errors and failures from occurring. Further, by identifying conflicts in service requests in relation to a configuration item before a requested update is applied, the disclosed system and methods avoid errors and service interruption that may occur as a result of processing conflicting service requests related to the configuration item. Thus, the disclosed system and methods improve efficiency of the computing nodes processing such service requests which in turn improves the overall processing efficiency of the computing infrastructure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Aspects of the present disclosure discuss a system and methods implemented by the system for end to end management of updates to a computing infrastructure automatically, intelligently and in a secure manner. The disclosed system leverages blockchain technology to record each activity related to performing an update. As transactions performed in a blockchain network are immutable, the disclosed system provides a secure mechanism to perform system updates, avoids unauthorized update activities and helps ensure traceability and accountability in the event of an unauthorized and malicious activity.

Figure 1:
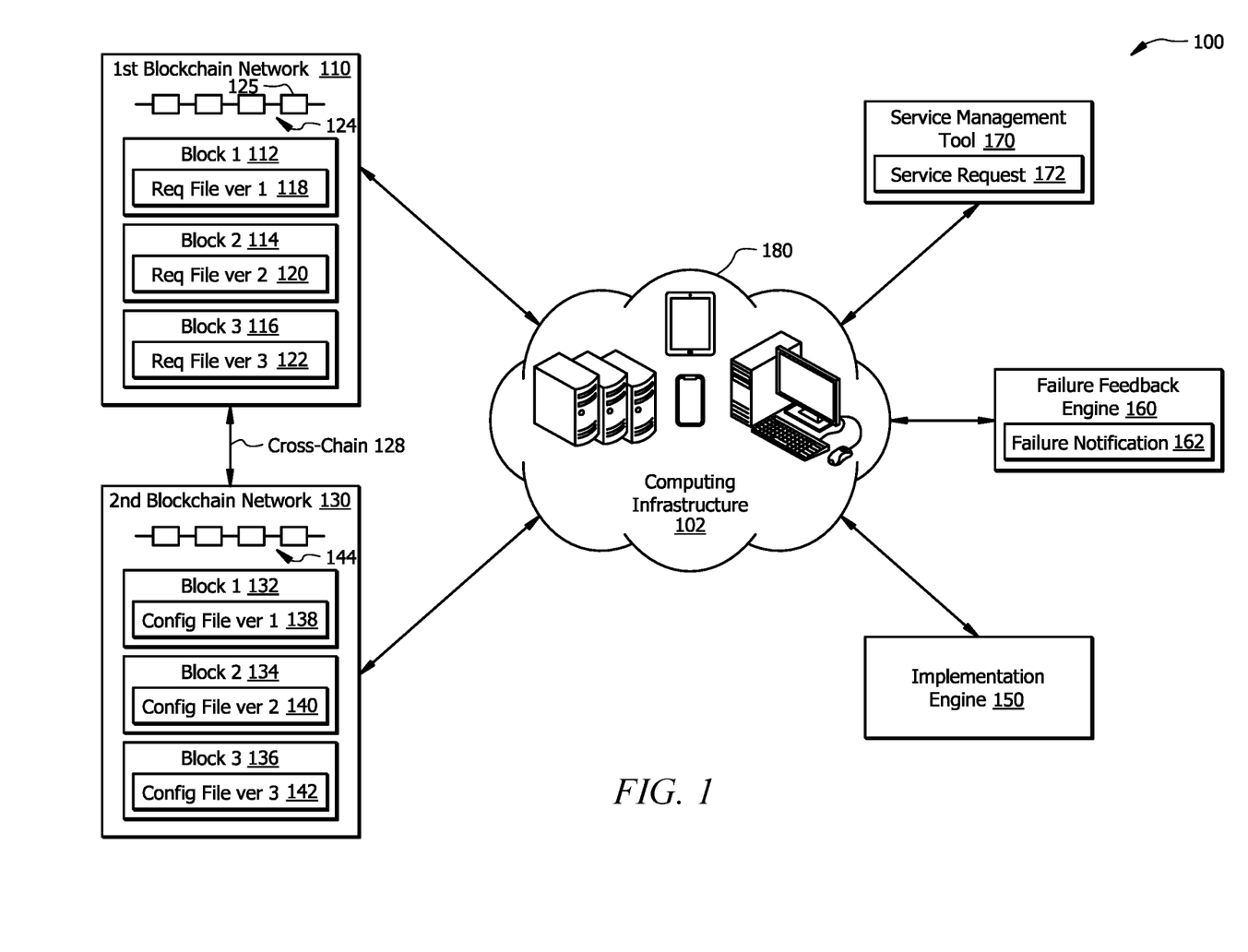
FIG. 1 is a schematic diagram of a system 100, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 180. Computing infrastructure 102 may be representative of an Information Technology (IT) infrastructure of an organization including a plurality of hardware and software components. The hardware components may include, but are not limited to, computing nodes such as desktop computers, smartphones, tablet computers, laptop computers, servers and data centers, and other hardware devices such as printers, routers, hubs, switches, and memory devices all connected to the network 180. Software components may include software applications that are run by one or more of the computing nodes including, but not limited to, operating systems, user interface applications, third party software, database management software, service management software and other customized software programs implementing particular functionalities. For example, software code relating to one or more software applications may be stored in a memory device and one or more processors may process the software code to implement respective functionalities.

Each computing node 104 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet. Each user device 190 may be a computing device that can be operated by a user 192 and communicate with other devices connected to the network 180.

The computing nodes 104 or a portion thereof of the computing infrastructure 102 may be part of one or more blockchain networks. For example, a first set of computing nodes 104 may be part of a first blockchain network 110 and a second set of the computing nodes 104 may be part of a second blockchain network 130. The first and second set of computing nodes 104 may share one or more computing nodes 104, meaning one or more computing nodes 104 may be part of the first blockchain network 110 as well as the second blockchain network 130. The first blockchain network 110 implements a blockchain 124 across the first set of the computing nodes 104 and the second blockchain network 130 implements a blockchain 144 across the second set of the computing nodes 104. The first blockchain network 110 may be communicatively coupled to the second blockchain network 130 using a cross-chain 128. Cross-chain technology generally allows interoperability between two relatively independent blockchains. In the context of the present disclosure, cross-chain 128 allows the first blockchain network 110 and the second blockchain network 130 to transfer data file between them.

A blockchain (e.g., blockchains 124 and 144) generally is an open, decentralized and distributed digital ledger consisting of records called blocks that are used to record interactions across many computing nodes (e.g., computing nodes 104). Each computing node 104 of a blockchain network (e.g., first blockchain network 110 and second blockchain network 130) may maintain a copy of the blockchain ledger. Logically, a blockchain is a chain of blocks which contains specific information. Once recorded, the data in any given block cannot be altered retroactively without alteration of all subsequent blocks, which requires consensus of the network majority. Each computing node within the blockchain network maintains, approves, and updates new entries. The system is controlled not only by separate individuals, but by everyone within the blockchain network. Each member ensures that all records and procedures are in order, which results in data validity and security. Thus, the distributed ledger can record interactions between two parties efficiently and in a verifiable and permanent way. By design, a blockchain is resistant to modification of the data. For use as a distributed ledger, a blockchain is typically managed by a peer-to-peer network collectively adhering to a protocol for inter-node communication and validating new blocks. In the context of the present disclosure, each computing node 104 of the first set of computing nodes 104 may store a copy of a blockchain ledger of the first blockchain network 110, wherein each copy of the blockchain ledger includes a copy of the blockchain 124. Similarly, each computing node 104 of the second set of computing nodes 104 may store a copy of a blockchain ledger of the second blockchain network 130, wherein each copy of the blockchain ledger includes a copy of the blockchain 144.

Each computing node 104 of a blockchain network (e.g., first blockchain network 110 and second blockchain network 130) is configured to process new blocks generated for the blockchain (e.g., 124 and 144) and maintain a most recent copy of the blockchain in the respective ledgers. Any new interaction or activity within the blockchain network may trigger the building of a new block of the blockchain. An interaction may include a computing node 104 of the blockchain network transmitting or receiving data from another computing node 104 of the blockchain network. Before a new block is added to the blockchain, it needs to be verified by a majority of the computing nodes in the blockchain network. For example, once a new block 125 is created at a computing node 104 belonging to the first blockchain network 110, the new block 125 is sent to each other computing node 104 from the first blockchain network 110. Each other computing node 104 verifies the new block 125 and checks whether the information stated in the new block 125 is correct. Once approved by a majority of the computing nodes 104, the new block 125 is added to the blockchain 124. Once a new block 125 is approved for addition to the blockchain 124, each of the computing nodes 104 of the first blockchain network 110 may be configured to update a local copy of the blockchain 124 persisted in the respective ledger to reflect the addition of the new block 125.

Each block of the blockchain (e.g., 124 and 144) includes a hash of the block, a hash of the previous block, data that records one or more interactions or activities associated with the block, and a timestamp of the one or more interactions or activities recorded by the block. The data stored in each block depends on the type of blockchain. For example, the data included in each block may include information relating to the interaction recorded by the block including transmitting/receiving data, details of the data files, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm. A blockchain network (e.g., 110 and/or 130) uses public-key cryptography to securely transfer data between computing nodes. Public-key cryptography uses a combination of a public key and private key to secure data in a blockchain network so that only the rightful owner of data can access the data. A public key is like an address on the blockchain to which data may be sent and recorded as belonging to that address. A private key is like a password that gives a user access to digital assets recorded against a public key.

One or more computing nodes 104 may implement one or more other services or functionalities such as service management tool 170, implementation engine 150 and failure feedback engine 160. For example, one or more computing nodes 104 may run respective software programs to implement each of the service management tool 170, implementation engine 150 and failure feedback engine 160.

Service management tool 170 may be configured to generate service requests 172 to update a software application or program (also referred to as primary software application/program in this disclosure) in the computing infrastructure 102. For example a user of the computing infrastructure 102 having the appropriate authorization and credentials can raise a service request 172 to update a software application. The service request 172 may include information relating an identity of the software application that is to be updated, details regarding a nature of the requested update, what instance of the software application is to be updated (e.g., development instance, test instance etc.) and any other information relevant to performing the update.

First blockchain network 110 may be configured to receive the service request 172 generated by the service management tool 170. For example a computing node 104 from the first set of computing nodes 104 of the first blockchain network 110 may receive the service request 172. The first blockchain network 110 helps ensure that appropriate input parameters are collected and verified in relation to all stakeholders associated with or affected by the requested update. The term "stakeholder" generally refers to any person or group within an organization affected by the requested software update. For example, upon receiving the service request 172, one or more computing nodes 104 of the first blockchain network 110 may determine one or more secondary software applications/programs that may be affected by the requested update of the primary software application. A secondary software application/program may include any application/program that must also be updated to implement the requested update. For example, when the service request 172 requests that a new data field is added to a webpage application, a background database may also need to be updated that is to store data relating to the new data field, for example, by adding a new data table or a new column to an existing data table that will store data relating to the new data field. In this example, the web application is the primary software application requested to be updated and the database application is the secondary application. A secondary software application/program may also include one or more upstream applications/programs that are affected by the requested update. For example one or more upstream applications may provide inputs to the primary software application requested to be updated. A secondary software application/program may also include one or more downstream applications/programs that are affected by the requested update. For example, one or more downstream applications may receive input from the primary software application requested to be updated. For example, the requested update may affect how an upstream application provides input (e.g., content, format etc.) to the updated primary software application and/or may affect how a downstream application receives input (e.g., content, format etc.) from the updated primary software application. In such a case, one or more upstream and/or downstream applications may also need to be updated appropriately.

After identifying one or more secondary applications/programs, one or more computing nodes 104 from the first blockchain network 110 determine one or more update activities that are to be performed to implement the requested update of the primary software application. The update activities may include update activities to be performed to update the primary software application as well as each identified secondary software application. For example, the update activities may include software code that that needs to be run to perform the updates. In one or more embodiments, one or more computing nodes of the first blockchain network 110 identify one or more configuration items related to an identified update activity or that may be affected by an update activity in relation to the primary software application and the one or more secondary software applications. A configuration item generally refers to a service component, infrastructure element or any other item that needs to be managed in order to ensure successful delivery of services in the computing infrastructure 102. configuration items in a computing infrastructure 102 may include, but are not limited to, hardware devices including computers and servers, software applications, communication networks, databases, services, locations, facilities and other systems. For example, a secondary application that is to be updated may be run by a particular server in the computing infrastructure 102. This means an update needs to be performed on the particular server to update the secondary software application. In this case, the particular server is a configuration item affected by the update.

Once any secondary applications are identified, respective update activities are determined and affected configuration items are identified, one or more computing nodes 104 for the first blockchain network 110 may generate a first version of a request file 118 (shown as Request File ver1) that includes information relating to the primary application, the identified secondary application. the update activities (e.g., software code to be run for an update) that are to be performed with respect to the primary and secondary applications and the identified configuration items (e.g., identity of the configuration items). Essentially, a detailed update plan is included in the request file 118 that includes information relating to which applications (e.g., primary and secondary applications) are to be updated, how (e.g., identified update activities) the applications are to be updated and where (e.g., configuration items) the update activities are to be performed. The one or more computing nodes 104 may then create a new block 112 (shown as Block 1) including the first version of the request file 118 and add the new block 112 to the blockchain 124 as described above.

One or more computing nodes 104 from the first set of computing nodes 104 of the first blockchain network 110 may be configured to receive and decode the first version of the request file 118 from the respective block 112 of the blockchain 124, for example, using a public key of the block and its private key. After extracting information from the first version of the request file 118, the one or more computing nodes 104 may be configured to verify the update activities listed in the first version of the request file 118 for the respective primary software application and/or each respective secondary software application. Verifying the update activities for a software application (e.g., primary or secondary software application) may include checking whether a determined update activity can be successfully performed for the respective software application. In one embodiment, verifying the update activities for a software application may include checking whether the update activities are in accordance with a design and/or configuration of the application. For example, the verifying may include validating software code that is to be run to perform an update activity for a software application. The one or more computing nodes 104 may be configured to generate a second version of the request file 120 (shown as Request File ver2) by adding information relating to the verified and/or validated update activities to the first version of the request file 118. For example, the second version of the request file 120 may include validate software code for updating one or more of the software applications, in addition to all information from the first version of the request file 118. The one or more computing nodes 104 may then create a new block 114 (shown as Block 2) including the second version of the request file 120 and add the new block 114 to the blockchain 124 as described above.

One or more computing nodes of the first blockchain network 110 may be configured to receive and decode the second version of the request file 120 from the respective block 114 of the blockchain 124, for example, using a public key of the block and its private key. After extracting information from the second version of the request file 120, the one or more computing nodes 104 may be configured to identify one or more users that are to perform the update activities listed in the second version of the request file 120. For example, several support teams (e.g., database team, middleware support teams, application support teams) may be involved in performing the requested update, wherein each support team may be responsible for performing a portion of the update activities to implement the update. For example, a database administrator may apply an update to a database, a member of the middleware team may implement a middleware update and a member of the application support team may implement an update to a front-end application. Depending on what software applications (e.g., primary and secondary applications) are to be updated and/or what update activities are to be performed (as listed in the request file 120), one or more computing nodes of the first blockchain network 110 identify one or more support teams and one or more users from the one or more support teams that can perform the update activities relating to the software applications. The one or more computing nodes 104 may be configured to generate a third version of the request file 122 (shown as Request File ver3) by adding information relating to the identified support teams and/or users from the support teams to the second version of the request file 120. In one embodiment, each identified support team may validate the respective update activities to be performed by the support team and the validation may be recorded in the third version of the request file 122. The one or more computing nodes 104 may then create a new block 116 (shown as Block 3) including the third version of the request file 122 and add the new block 116 to the blockchain 124 as described above.

It may be noted that all operations described above as being performed by the first blockchain network 110 may be performed by a single computing node 104 of the first blockchain network 110 or a plurality of computing nodes 104 of the first blockchain network 110.

Second blockchain network 130 may be configured to receive the third version of the request file 122 from the first blockchain network 110 via cross-chain 128. For example, one or more computing nodes of the second blockchain network 130 may be configured to receive the third version of the request file 122 from the first blockchain network 110 and decode the request file 122 from the respective block 116, for example, using a public key of the block and its private key. As described above, the request file 122 may include information relating to one or more configuration items (e.g., host, server, middleware component etc.) that need to be updated. After extracting information from the request file 122, the one or more computing nodes 104 of the second blockchain network 130 may identify one or more attributes of each configuration item that is listed in the request file 122. Attributes of a configuration item are generally data elements that describe the characteristics of the configuration item. For example, the attributes of a configuration item—workstation may include model, service tag, IP address, processor speed etc. In one embodiment, the one or more computing nodes may search a configuration management database that stores attributes for each configuration item in the computing infrastructure 102. The configuration management database may be a database that stores all relevant information about the hardware and software components used in an organization's IT infrastructure (e.g., computing infrastructure 102) and the relationships between those components. Within the context of the configuration management database, the components of the IT infrastructure are referred to as configuration items. A computing node 104 of the second blockchain network 130 may extract attributes of one or more configuration items listed in the request file 122 by searching the configuration management database. One or more computing nodes of the second blockchain network 130 may generate a first version of a configuration file 138 (shown as Config File ver1) by adding identified attributes of each configuration item to the request file 122. The one or more computing nodes 104 may then create a new block 132 (shown as Block 1) including the first version of the configuration file 138 and add the new block 132 to the blockchain 144 as described above.

One or more computing nodes of the second blockchain network 130 may be configured to receive and decode the first version of the configuration file 138 from the respective block 132 of the blockchain 144, for example, using a public key of the block and its private key. After extracting information from the first version of the configuration file 138, the one or more computing nodes 104 may be configured to identify for each configuration item listed in the configuration file 138, whether a conflicting service activity is requested for the configuration item that can interfere with updating the configuration item. A computing node 104 may check whether a configuration item listed in the configuration file 138 is part of another service request to be processed simultaneously. For example, two different patches may be scheduled to be applied to the same application simultaneously by two separate service requests. This may create a conflict in that allowing the simultaneous updates to be processed at the configuration item simultaneously may corrupt the application or another application hosted at the configuration item leading to unplanned outages. For example, a server may host several applications, wherein a secondary application may be scheduled for update at the server based on the service request 172. Based on a separate service request, the same secondary application or a different software application may be scheduled for update at the same server simultaneously during the same time window. In this case, the two updates may conflict with each other. All such conflicts may be detected and identified by one or more computing nodes 104 of the second blockchain network 130. One or more computing nodes 104 of the second blockchain network 130 may generate a second version of the configuration file 140 (shown as Config File ver2) by adding to the configuration file 138 information relating to whether any conflicts exists for each configuration item and information relating to any identified conflicts for a configuration item. The one or more computing nodes 104 may then create a new block 134 (shown as Block 2) including the second version of the configuration file 140 and add the new block 134 to the blockchain 144 as described above. In one embodiment, one or more computing nodes 104 may identify whether a configuration item is part of an incident that may interfere with a scheduled update, and include information relating to any such incidents in the second version of the configuration file 140.

One or more computing nodes 104 of the second blockchain network 130 may be configured to receive and decode the second version of the configuration file 140 from the respective block 134 of the blockchain 144, for example, using a public key of the block and its private key. After extracting information from the second version of the configuration file 140, the one or more computing nodes 104 may be configured to validate login credentials of the one or more users identified in the configuration file 140 for performing the update activities. Validation of a user and associated update activity may include capturing a justification for performing the update activity by the user and whether the justification for performing the update activity has been approved by appropriate personnel. Each update activity generally needs to be evaluated to determine whether a justified reason exists and has been provided for performing the update activity. For example, a service provided by a server may need to be interrupted to perform a server update. The reason for performing the update must be justified to warrant the service interruption. In this case, the justification for the update may be evaluated based on the nature of the update and the length of service interruption. In one or more embodiments, a user is allowed to perform an update activity when a justification for performing the update activity has been provided and approved. Validation of a user may also include checking and verifying access credentials of the user to determine whether the user has proper access credentials to perform an approved update activity (e.g., having approved justification). In one embodiment, a password vaulting tool may securely maintain user accounts, access credentials (e.g., user login and passwords) and user privileges. A computing node 104 of the second blockchain network 130 may verify access credentials of a user and appropriate privileges to perform an update based on the information in the password vaulting tool. The one or more computing nodes of the second blockchain network 130 may generate a third version of the configuration file 142 (shown as Config File ver3) by adding to the second version of the configuration file 140 information relating to validated access credentials of the one or more users. The one or more computing nodes 104 may then create a new block 136 (shown as Block 3) including the third version of the configuration file 142 and add the new block 136 to the blockchain 144 as described above.

Thus, the final version of the configuration file 142 includes a verified and approved plan to perform the update requested by the service request 172, including information relating to which applications (e.g., primary and secondary applications) are to be updated, how (e.g., validated update activities) the applications are to be updated, where (e.g., configuration items) the update activities are to be performed, who (one or more identified users) is to perform the update activities, properties (configuration item attributes) of the identified configuration items to be updated, if any request conflicts exist in relation to each configuration item and validated user credentials for each user that is to perform the update activities or a portion thereof. Once the configuration file 142 has been generated, the identified users may perform the update activities based on the information in the configuration file 142.

Implementation engine 150 may be configured to determine whether the service request 172 was processed successfully, meaning whether the primary software application and any identified secondary software applications/programs where updated successfully. Implementation engine 150 may be configured to record a first configuration state of one or more of the primary software application and any secondary software applications before respective updates are performed. Once the updates have been performed, implementation engine 150 records a second configuration state of the one or more of the primary software application and any secondary software applications. Implementation engine 150 compares the pre-update first configuration states with respective post-update second configuration states of the software applications to determine whether the updates have been successfully applied. If the updates have been successfully applied, implementation engine 150 determines that the service request 172 has been successfully processed and sends a notification of the successful processing to the failure feedback engine 160 and the service management tool 170. On the other hand, when it is detected that the updates have not been properly applied to the primary application or one or more secondary applications, implementation engine 150 determines that the service request 172 has failed. Implementation engine 150 may be configured to record failed service requests including one or more reasons for the failure. For example, implementation engine 150 may record that the service request 172 failed as a validated code (e.g., from the configuration file 142) did not successfully apply an update to a respective secondary application. Implementation engine 150 may be configured to send a failure notification 162 of failed service requests including reasons for each failure to the failure feedback engine 160 and the service management tool 170. In an embodiment, implementation engine 150 may perform the above stated functions using an robotic process automation (RPA) engine. In one embodiment, implementation may additionally examine configuration and performance of any upstream or downstream components post an update to determine whether all upstream and downstream components are operating normally after the requested update has been applied.

Failure feedback engine 160 may run a machine learning module that continually learns from successful and failed service requests and provides inputs to the service management tool on how subsequent service requests may be tweaked so that similar failures may be avoided in the future. For example, the failure feedback engine 160 may analyze the reasons for a failed service request based on information received in a failure notification 162 and may propose one or more corrective actions to service management tool 170 so that failures of subsequent service requests may be avoided.

Figure 2:
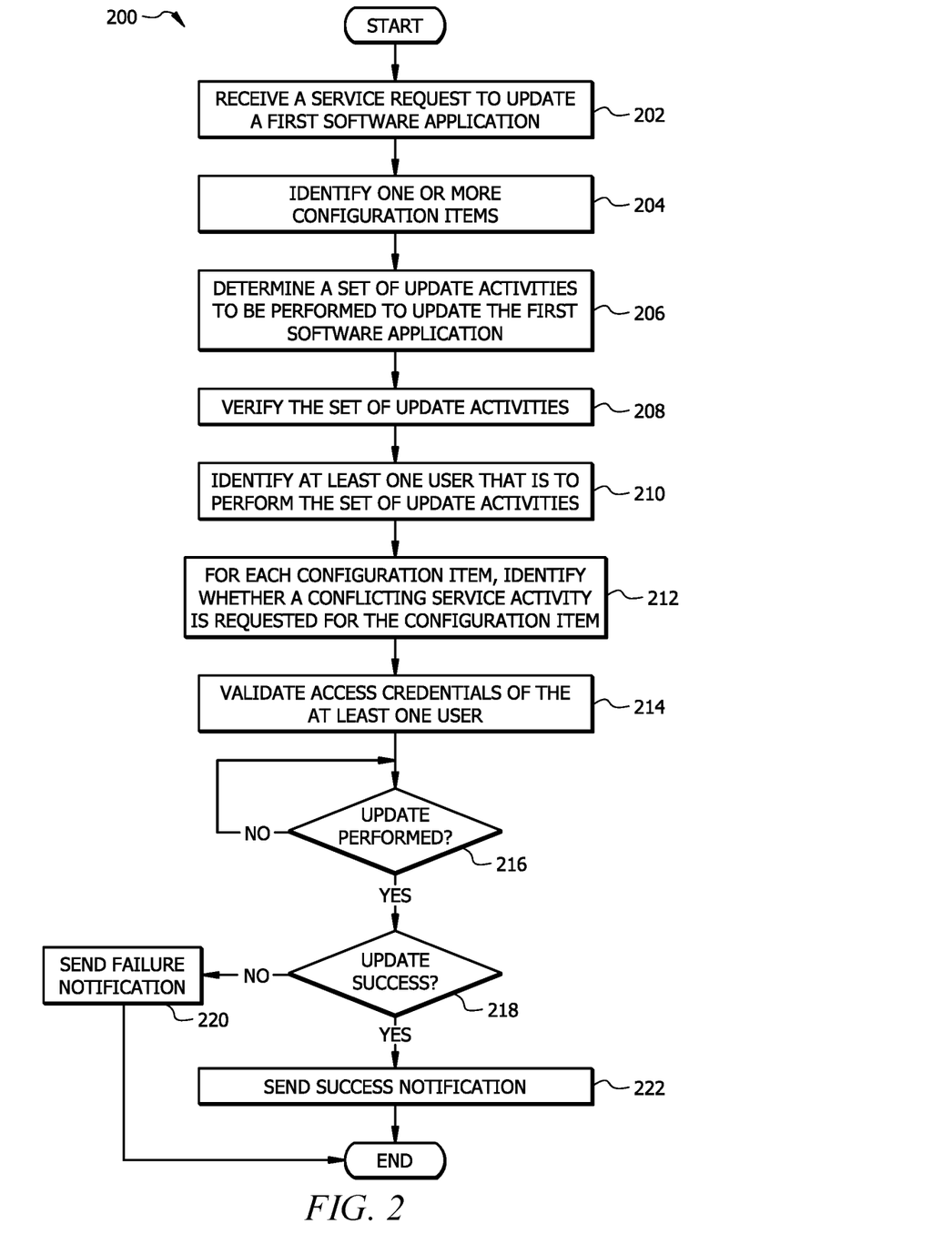
FIG. 2 illustrates a flowchart of an example method for managing an update in a computing infrastructure, in accordance with one or more embodiments of the present disclosure.

FIG. 2 illustrates a flowchart of an example method 200 for managing an update in a computing infrastructure 102, in accordance with one or more embodiments of the present disclosure. Method 200 may be performed by system 100 or a portion thereof.

At operation 202, a first blockchain network 110 receives a service request 172 to update a first software application (e.g., primary software application as described above) of a plurality of software applications of the computing infrastructure 102.

As described above, service management tool 170 may be configured to generate service requests 172 to update a software application or program (also referred to as primary software application/program in this disclosure) in the computing infrastructure 102. For example a user of the computing infrastructure 102 having the appropriate authorization and credentials can raise a service request 172 to update the software application. The service request 172 may include information relating to an identity of the software application that is to be updated, details regarding a nature of the requested update, what instance of the software application is to be updated (e.g., development instance, test instance etc.) and any other information relevant to performing the update. First blockchain network 110 may be configured to receive the service request 172 generated by the service management tool 170. For example a computing node 104 from a first set of computing nodes 104 forming the first blockchain network 110 may receive the service request 172.

At operation 204, one or more computing nodes 104 of a first set of computing nodes 104 forming the first blockchain network determine one or more configuration items associated with updating the first software application.

Additionally at operation 206, one or more computing nodes 104 from the first set determine a set of update activities to be performed to perform the requested update of the first software application.

As described above, first blockchain network 110 helps ensure that appropriate input parameters are collected and verified in relation to all stakeholders associated with or affected by the requested update. The term "stakeholder" generally refers to any person or group within an organization affected by the requested software update. For example, upon receiving the service request 172, one or more computing nodes 104 of the first blockchain network 110 may determine one or more secondary software applications/programs that may be affected by the requested update of the primary software application. A secondary software application/program may include any application/program that must also be updated to implement the requested update. For example, when the service request 172 requests that a new data field is added to a webpage application, a background database may also need to be updated that is to store data relating to the new data field, for example, by adding a new data table or a new column to an existing data table that will store data relating to the new data field. In this example, the web application is the primary software application requested to be updated and the database application is the secondary application. A secondary software application/program may also include one or more upstream applications/programs that are affected by the requested update. For example one or more upstream applications may provide inputs to the primary software application requested to be updated. A secondary software application/program may also include one or more downstream applications/programs that are affected by the requested update. For example, one or more downstream applications may receive input from the primary software application requested to be updated. For example, the requested update may affect how an upstream application provides input (e.g., content, format etc.) to the updated primary software application and/or may affect how a downstream application receives input (e.g., content, format etc.) from the updated primary software application. In such a case, the upstream and/or downstream applications may also need to be updated appropriately.

After identifying one or more secondary applications/programs, one or more computing nodes 104 from the first blockchain network 110 determine one or more update activities that are to be performed to implement the requested update of the primary software application. The update activities may include update activities to be performed to update the primary software application as well as each identified secondary software application. For example, the update activities may include software code that that needs to be run to perform the updates. In one or more embodiments, one or more computing nodes of the first blockchain network 110 identify one or more configuration items (configuration items) related to an identified update activity or that may be affected by an update activity in relation to the primary software application and the one or more secondary software applications. A configuration item generally refers to a service component, infrastructure element or any other item that needs to be managed in order to ensure successful delivery of services in the computing infrastructure 102. configuration items in a computing infrastructure 102 may include, but are not limited to, hardware devices including computers and servers, software applications, communication networks, databases, services, locations, facilities and other systems. For example, a secondary application that is to be updated may be run by a particular server in the computing infrastructure 102. This means an update needs to be performed on the particular server to update the secondary software application. In this case, the particular server is a configuration item affected by the update.

Once any secondary applications are identified, respective update activities are determined and affected configuration items are identified, one or more computing nodes 104 from the first blockchain network 110 may generate a first version of a request file 118 (shown as Request File ver1 in FIG. 1) that includes information relating to the primary application, the identified secondary application, the update activities (e.g., software code to be run for an update) that are to be performed with respect to the primary and secondary applications and the identified configuration items (e.g., identity of the configuration items). Essentially, a detailed update plan is included in the request file 118 that includes information relating to which applications (e.g., primary and secondary applications) are to be updated, how (e.g., identified update activities) the applications are to be updated and where (e.g., configuration items) the update activities are to be performed. The one or more computing nodes 104 may then create a new block 112 (shown as Block 1 in FIG. 1) including the first version of the request file 118 and add the new block 112 to the blockchain 124 as described above.

At operation 208, one or more computing nodes of the first blockchain network 110 verify the identified set of update activities to check whether each of the update activities can be performed in relation to the first software application.

As described above, one or more computing nodes 104 from the first set of computing nodes 104 of the first blockchain network 110 may be configured to receive and decode the first version of the request file 118 from the respective block 112 of the blockchain 124, for example, using a public key of the block 112 and its private key. After extracting information from the first version of the request file 118, the one or more computing nodes 104 may be configured to verify the update activities listed in the first version of the request file 118 for the respective primary software application and/or each respective secondary software application. Verifying the update activities for a software application (e.g., primary or secondary software application) may include checking whether a determined update activity can be successfully performed for the respective software application. In one embodiment, verifying the update activities for a software application may include checking whether the update activities are in accordance with a design and/or configuration of the application. For example, the verifying may include validating software code that is to be run to perform an update activity for a software application. The one or more computing nodes 104 may be configured to generate a second version of the request file 120 (shown as Request File ver2) by adding information relating to the verified and/or validated update activities to the first version of the request file 118. For example, the second version of the request file 120 may include validate software code for updating one or more of the primary and secondary software applications, in addition to all information from the first version of the request file 118. The one or more computing nodes 104 may then create a new block 114 (shown as Block 2 in FIG. 1) including the second version of the request file 120 and add the new block 114 to the blockchain 124 as described above.

At operation 210, one or more computing nodes 104 of the first blockchain network 110 identify at least one user that is to perform the set of update activities.

As described above, one or more computing nodes 104 of the first blockchain network 110 may be configured to receive and decode the second version of the request file 120 from the respective block 114 of the blockchain 124, for example, using a public key of the block and its private key. After extracting information from the second version of the request file 120, the one or more computing nodes 104 may be configured to identify one or more users that are to perform the identified update activities listed in the second version of the request file 120. For example, several support teams (e.g., database team, middleware support team, application support team) may be involved in performing the requested update, wherein each support team may be responsible for performing a portion of the update activities to implement the requested update. For example, a database administrator may apply an update to a database, a member of the middleware team may implement a middleware update and a member of the application support team may implement an update to a front-end application. Depending on what software applications (e.g., primary and secondary applications) are to be updated and/or what update activities are to be performed (as listed in the request file 120), one or more computing nodes 104 of the first blockchain network 110 identify one or more support teams and one or more users from the one or more support teams that can perform the update activities relating to the software applications. The one or more computing nodes 104 may be configured to generate a third version of the request file 122 (shown as Request File ver3 in FIG. 1) by adding information relating to the identified support teams and/or users from the support teams to the second version of the request file 120. In one embodiment, each identified support team may validate the respective update activities to be performed by the support team and the validation may be recorded in the third version of the request file 122. The one or more computing nodes 104 may then create a new block 116 (shown as Block 3 in FIG. 1) including the third version of the request file 122 and add the new block 116 to the blockchain 124 as described above.

As described above, a second blockchain network 130 may be configured to receive the third version of the request file 122 from the first blockchain network 110 via cross-chain 128. For example, one or more computing nodes 104 from a second set of computing nodes 104 forming the second blockchain network 130 may be configured to receive the third version of the request file 122 from the first blockchain network 110 and decode the request file 122 from the respective block 116, for example, using a public key of the block and its private key. As described above, the request file 122 may include information relating to one or more configuration items (e.g., host, server, middleware component etc.) that need to be updated. After extracting information from the request file 122, the one or more computing nodes 104 of the second blockchain network 130 may identify one or more attributes of each configuration item that is listed in the request file 122. Attributes of a configuration item are generally data elements that describe the characteristics of the configuration item. For example, the attributes of a configuration item—workstation may include model, service tag, IP address, processor speed etc.

In one embodiment, the one or more computing nodes 104 may search a configuration management database that stores attributes for each configuration item in the computing infrastructure 102. The configuration management database may be a database that stores all relevant information about the hardware and software components used in an organization's IT infrastructure (e.g., computing infrastructure 102) and the relationships between those components. Within the context of the configuration management database, the components of the IT infrastructure are referred to as configuration items. A computing node 104 of the second blockchain network 130 may extract attributes of one or more configuration items listed in the request file 122 by searching the configuration management database. One or more computing nodes of the second blockchain network 130 may generate a first version of a configuration file 138 (shown as Config File ver1 in FIG. 1) by adding identified attributes of each configuration item to the request file 122. The one or more computing nodes 104 may then create a new block 132 (shown as Block 1 in FIG. 1) including the first version of the configuration file 138 and add the new block 132 to the blockchain 144 as described above.

At operation 212, for each configuration item, one or more computing nodes 104 of a second blockchain network 130 identify whether a conflicting service activity is requested for the configuration item that can interfere with updating the configuration item according to the service request 172.

As described above, one or more computing nodes 104 of the second blockchain network 130 may be configured to receive and decode the first version of the configuration file 138 from the respective block 132 of the blockchain 144, for example, using a public key of the block and its private key. After extracting information from the first version of the configuration file 138, the one or more computing nodes 104 may be configured to identify for each configuration item listed in the configuration file 138, whether a conflicting service activity is requested for the configuration item that can interfere with updating the configuration item. A computing node 104 may check whether a configuration item listed in the configuration file 138 is part of another service request to be processed simultaneously. For example, two different patches may be scheduled to be applied to the same application simultaneously by two separate service requests. This may create a conflict in that allowing the simultaneous updates to be processed at the configuration item simultaneously may corrupt the application or another application hosted at the configuration item leading to unplanned outages. For example, a server may host several applications, wherein a secondary application may be scheduled for update at the server based on the service request 172. Based on a separate service request, the same secondary application or a different software application may be scheduled for update at the same server simultaneously during the same time window. In this case, the two updates may conflict with each other. All such conflicts may be detected and identified by one or more computing nodes 104 of the second blockchain network 130. One or more computing nodes 104 of the second blockchain network 130 may generate a second version of the configuration file 140 (shown as Config File ver2 in FIG. 1) by adding to the configuration file 138 information relating to whether any conflicts exists for each configuration item and information relating to any identified conflicts for a configuration item. The one or more computing nodes 104 may then create a new block 134 (shown as Block 2 in FIG. 1) including the second version of the configuration file 140 and add the new block 134 to the blockchain 144 as described above. In one embodiment, one or more computing nodes 104 may identify whether a configuration item is part of an incident that may interfere with a scheduled update, and include information relating to any such incidents in the second version of the configuration file 140.

At operation 214, one or more computing nodes 104 of the second blockchain network 130 validate access credentials of the at least one user that is to perform the set of update activities.

As described above, one or more computing nodes 104 of the second blockchain network 130 may be configured to receive and decode the second version of the configuration file 140 from the respective block 134 of the blockchain 144, for example, using a public key of the block and its private key. After extracting information from the second version of the configuration file 140, the one or more computing nodes 104 may be configured to validate login credentials of the one or more users identified in the configuration file 140 for performing the update activities. Validation of a user and associated update activity may include capturing a justification for performing the update activity by the user and whether the justification for performing the update activity has been approved by appropriate personnel. Each update activity generally needs to be evaluated to determine whether a justified reason exists and has been provided for performing the update activity. For example, a service provided by a server may need to be interrupted to perform a server update. The reason for performing the update must be justified to warrant the service interruption. In this case, the justification for the update may be evaluated based on the nature of the update and the length of service interruption. In one or more embodiments, a user is allowed to perform an update activity when a justification for performing the update activity has been provided and approved. Validation of a user may also include checking and verifying access credentials of the user to determine whether the user has proper access credentials to perform an approved update activity (e.g., having approved justification). In one embodiment, a password vaulting tool may securely maintain user accounts, access credentials (e.g., user login and passwords) and user privileges. A computing node 104 of the second blockchain network 130 may verify access credentials of a user and appropriate privileges to perform an update based on the information in the password vaulting tool. The one or more computing nodes of the second blockchain network 130 may generate a third version of the configuration file 142 (shown as Config File ver3 in FIG. 1) by adding to the second version of the configuration file 140 information relating to validated access credentials of the one or more users. The one or more computing nodes 104 may then create a new block 136 (shown as Block 3 in FIG. 1) including the third version of the configuration file 142 and add the new block 136 to the blockchain 144 as described above.

Thus, the final version of the configuration file 142 includes a verified and approved plan to perform the update requested by the service request 172, including information relating to which applications (e.g., primary and secondary applications) are to be updated, how (e.g., validated update activities) the applications are to be updated, where (e.g., configuration items) the update activities are to be performed, who (one or more identified users) is to perform the update activities, properties (configuration item attributes) of the identified configuration items to be updated, if any request conflicts exist in relation to each configuration item and validated user credentials for each user that is to perform the update activities or a portion thereof. Once the configuration file 142 has been generated, the identified users may perform the update activities based on the information in the configuration file 142.

At operation 216 a computing node 104 of the computing infrastructure 102 may check whether the requested update has been performed. If yes, method 200 proceeds to operation 218 where one or more computing nodes 104 check whether the update was successful.

As described above, implementation engine 150 may be configured to determine whether the service request 172 was processed successfully, meaning whether the primary software application and any identified secondary software applications/programs where updated successfully. Implementation engine 150 may be configured to record a first configuration state of one or more of the primary software application and any secondary software applications before respective updates are performed. Once the updates have been performed, implementation engine 150 records a second configuration state of the one or more of the primary software application and any secondary software applications. Implementation engine 150 compares the pre-update first configuration states with respective post-update second configuration states of the software applications to determine whether the updates have been successfully applied. If the updates have been successfully applied, implementation engine 150 determines that the service request 172 has been successfully processed and sends a notification (at operation 222) of the successful processing to the failure feedback engine 160 and the service management tool 170. On the other hand, when it is detected that the updates have not been properly applied to the primary application or one or more secondary applications, implementation engine 150 determines that the service request 172 has failed. Implementation engine 150 may be configured to record failed service requests including one or more reasons for the failure. For example, implementation engine 150 may record that the service request 172 failed as a validated code (e.g., from the configuration file 142) did not successfully apply an update to a respective secondary application. Implementation engine 150 may be configured to send a failure notification 162 (at operation 220) of failed service requests including reasons for each failure to the failure feedback engine 160 and the service management tool 170. In an embodiment, implementation engine 150 may perform the above stated functions using an robotic process automation (RPA) engine. In one embodiment, implementation may additionally examine configuration and performance of any upstream or downstream components post an update to determine whether all upstream and downstream components are operating normally after the requested update has been applied.

Failure feedback engine 160 may run a machine learning module that continually learns from successful and failed service requests and provides inputs to the service management tool on how subsequent service requests may be tweaked so that similar failures may be avoided in the future. For example, the failure feedback engine 160 may analyze the reasons for a failed service request based on information received in a failure notification 162 and may propose one or more corrective actions to service management tool 170 so that failures of subsequent service requests may be avoided.

Figure 3:
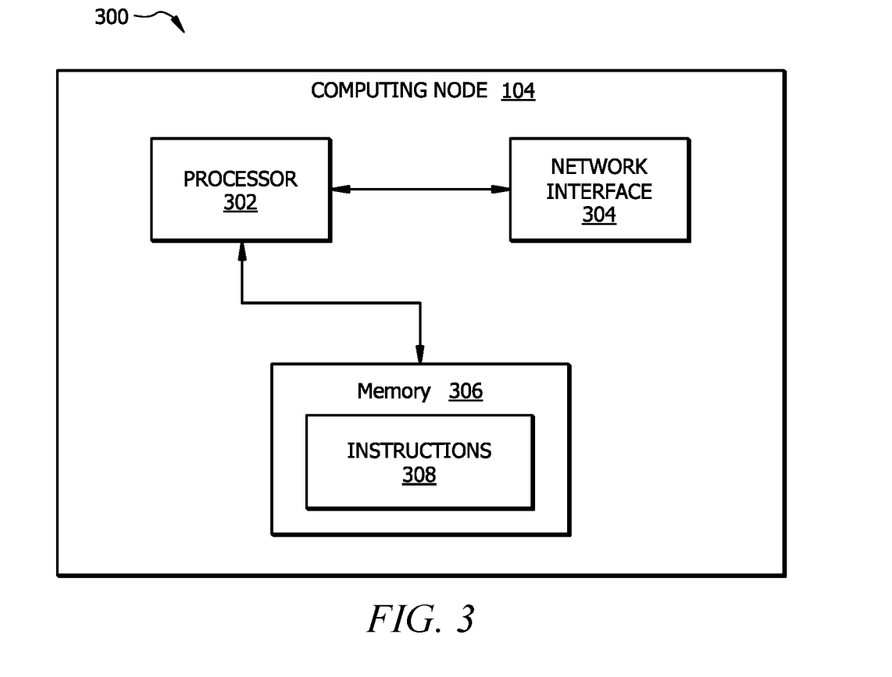
FIG. 3 illustrates an example schematic diagram of a computing node, in accordance with one or more aspects of the present disclosure.

FIG. 3 illustrates an example schematic diagram 300 of a computing node 104, in accordance with one or more aspects of the present disclosure. The computing node 104 as shown in FIG. 3 may part of the first blockchain network 110 and/or the second blockchain network 130 and may perform at least a portion of the functions performed by the first blockchain network 110 and/or the second blockchain network 130. The computing node 104 may additionally or alternatively implement one or more of the service management tool 170, implementation engine 150 and the failure feedback engine 160.

The computing node 104 comprises a processor 302, a memory 306, and a network interface 304. The computing node 104 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions 308 to implement one or more functions of the computing node 104 described above. In this way, processor 302 may be a special-purpose computer designed to implement the functions disclosed herein.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store data and instructions used to implement a respective function of the computing node 104. For example, when the computing node 104 is part of the first blockchain network 110, memory 306 may store a copy of the blockchain 124 including copies of request file versions 1, 2 and 3.

The network interface 304 is configured to enable wired and/or wireless communications. The network interface 304 is configured to communicate data between the computing node 104 and other devices (e.g. other computing nodes 104 of the computing infrastructure 102), systems, or domains. For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A method for managing updates in a computing infrastructure, comprising:
   receiving a service request to update a first software application of the plurality of software applications of the computing infrastructure;
   identifying one or more configuration items associated with updating the first software application;
   determining a set of update activities to be performed to update the first software application;
   verifying the set of update activities to check whether each of the update activities can be performed in relation to the first software application;
   identifying at least one user that is to perform the set of update activities;
   generating a request file at least including information relating to the one or more configuration items, the set of update activities, verified update activities from the set of update activities, and the at least one user;
   generating a request block of a first blockchain network;
   storing the request file in the request block of the first blockchain network;
   extracting the request file from the request block of the first blockchain network;
   identifying one or more attributes relating to each of the identified configuration items;
   generating a first version of a configuration file by adding information relating to the one or more attributes to the request file;
   generating a first configuration block of a second blockchain network;
   storing the first version of the configuration file in the first configuration block of the second blockchain network;
   extracting the first version of the configuration file from the first configuration block of the second blockchain network;
   for each of the configuration items, identifying whether a conflicting service activity is requested for the configuration item that can interfere with updating the configuration item according to the service request;
   generating a second version of the configuration file by adding, to the first version of the configuration file, information relating to whether the conflicting activity exists for each configuration item;
   generating a second configuration block of the second blockchain network;
   storing the second version of the configuration file in the second configuration block of the second blockchain network;
   validating access credentials of the at least one user that is to perform the set of update activities; and
   generating at least one file that includes information relating to one or more of the verified set of update activities, the at least one user, the identified configuration items, whether a conflicting service activity exists for each configuration item and validated access credentials of the at least one user, wherein the service request is processed according to the information in the at least one file to update the first software application.

2. The method of claim 1, further comprising:
   receiving the service request to update the first software application at the first blockchain network;
   identifying at least one second software application that is to be updated to implement the requested update of the first software application;
   determining one or more update activities to be performed to update the at least one second software application, wherein the one or more update activities is part of the set of update activities;
   generating a first version of a request file including information relating to the identified at least one software application and the one or more update activities;
   generating a first block of the first blockchain network including the first version of the request file; and
   adding the first block to a blockchain of the first blockchain network.

3. The method of claim 2, further comprising:
   extracting the first version of the request file from the first block;
   verifying the one or more update activities to be performed to update the at least one second software application;
   generating a second version of the request file by adding the verified one or more update activities to the first version of the request file;
   generating a second block of the first blockchain network including the second version of the request file; and
   add the second block to the blockchain of the first blockchain network.

4. The method of claim 3, further comprising:
   extracting the second version of the request file from the second block;
   identifying a user that is to perform the one or more update activities to update the at least one second software application;
   generating a third version of the request file by adding information relating to the user to the second version of the request file; and
   generating a third block of the first blockchain network including the third version of the request file.

5. The method of claim 4, further comprising:
   receiving the third version of the request file at the second blockchain network from the first blockchain network;
   identifying one or more attributes relating to each of the identified configuration items;

generating the first version of a configuration file by adding information relating to each identified configuration item and respective one or more attributes to the third version of the request file; and
generate a first block of the second blockchain network including the first version of the configuration file.

6. The method of claim 5, further comprising:
extracting the first version of the configuration file from the first block of the second blockchain network;
for each of the configuration items, identifying whether a conflicting service activity is requested for the configuration item that can interfere with updating the configuration item according to the service request;
generating the second version of the configuration file by adding information to the first version of the configuration file relating to whether the conflicting service activity exists for each configuration item; and
generating a second block of the second blockchain network including the second version of the configuration file.

7. The method of claim 6, further comprising:
extracting the second version of the configuration file from the second block of the second blockchain network;
validating the access credentials of the at least one user that is to perform the set of update activities to update the at least one second software application;
generating a third version of the configuration file by adding information to the second version of the configuration file relating to the validated access credentials of the at least one user; and
generating a third block of the second blockchain network including the third version of the configuration file, wherein the service request is processed based on information in the third version of the configuration file.

8. A system comprising:
a computing infrastructure including a plurality of hardware components and a plurality of software components, wherein the plurality of hardware components include a plurality of computing nodes and wherein the plurality of software components includes a plurality of software applications; and
at least one blockchain network including one or more computing nodes from the plurality of computing nodes of the computing infrastructure, wherein the one or more computing nodes of the at least one blockchain network comprise one or more processors that are configured to:
  receive a service request to update a first software application of the plurality of software applications;
  identify one or more configuration items associated with updating the first software application;
  determine a set of update activities to be performed to update the first software application;
  verify the set of update activities to check whether each of the update activities can be performed in relation to the first software application;
  identify at least one user that is to perform the set of update activities;
  generate a request file at least including information relating to the one or more configuration items, the set of update activities, verified update activities from the set of update activities, and the at least one user;
  generate a request block of a first blockchain network;
  store the request file in the request block of the first blockchain network;
  extract the request file from the request block of the first blockchain network;
  identify one or more attributes relating to each of the identified configuration items;
  generate a first version of a configuration file by adding information relating to the one or more attributes to the request file;
  generate a first configuration block of a second blockchain network;
  store the first version of the configuration file in the first configuration block of the second blockchain network;
  extract the first version of the configuration file from the first configuration block of the second blockchain network;
  for each of the configuration items, identify whether a conflicting service activity is requested for the configuration item that can interfere with updating the configuration item according to the service request;
  generate a second version of the configuration file by adding, to the first version of the configuration file, information relating to whether the conflicting activity exists for each configuration item;
  generate a second configuration block of the second blockchain network;
  store the second version of the configuration file in the second configuration block of the second blockchain network;
  validate access credentials of the at least one user that is to perform the set of update activities; and
  generate at least one file that includes information relating to one or more of the verified set of update activities, the at least one user, the identified configuration items, whether a conflicting service activity exists for each configuration item and validated access credentials of the at least one user, wherein the service request is processed according to the information in the at least one file to update the first software application.

9. The system of claim 8, wherein the at least one blockchain network comprises a first blockchain network including a first set of the computing nodes comprising a first set of processors configured to:
  receive the service request to update the first software application;
  identify at least one second software application that is to be updated to implement the requested update of the first software application;
  determine one or more update activities to be performed to update the at least one second software application, wherein the one or more update activities is part of the set of update activities;
  generate a first version of a request file including information relating to the identified at least one software application and the one or more update activities;
  generate a first block of the first blockchain network including the first version of the request file; and
  add the first block to a blockchain of the first blockchain network.

10. The system of claim 9, wherein the first set of processors is further configured to:
  extract the first version of the request file from the first block;
  verify the one or more update activities to be performed to update the at least one second software application;

generate a second version of the request file by adding the verified one or more update activities to the first version of the request file;
generate a second block of the first blockchain network including the second version of the request file; and
add the second block to the blockchain of the first blockchain network.

11. The system of claim 10, wherein the first set of processors is further configured to:
extract the second version of the request file from the second block;
identify a user that is to perform the one or more update activities to update the at least one second software application;
generate a third version of the request file by adding information relating to the user to the second version of the request file; and
generate a third block of the first blockchain network including the third version of the request file.

12. The system of claim 11, wherein the at least one blockchain network comprises the second blockchain network communicatively coupled to the first blockchain network and including a second set of the computing nodes comprising a set of processors configured to:
obtain the third version of the request file from the first blockchain network;
identify one or more attributes relating to each of the identified configuration items;
generate the first version of a configuration file by adding information relating to each identified configuration item and respective one or more attributes to the third version of the request file; and
generate a first block of the second blockchain network including the first version of the configuration file.

13. The system of claim 12, wherein the first blockchain network and the second blockchain network are communicatively coupled using cross-chain technology.

14. The system of claim 12, wherein the second set of processors is configured to:
extract the first version of the configuration file from the first block of the second blockchain network;
for each of the configuration items, identify whether a conflicting service activity is requested for the configuration item that can interfere with updating the configuration item according to the service request;
generate the second version of the configuration file by adding information to the first version of the configuration file relating to whether the conflicting service activity exists for each configuration item; and
generate a second block of the second blockchain network including the second version of the configuration file.

15. The system of claim 14, wherein the second set of processors is further configured to:
extract the second version of the configuration file from the second block of the second blockchain network;
validate the access credentials of the at least one user that is to perform the set of update activities to update the at least one second software application;
generate a third version of the configuration file by adding information to the second version of the configuration file relating to the validated access credentials of the at least one user; and
generate a third block of the second blockchain network including the third version of the configuration file, wherein the service request is processed based on information in the third version of the configuration file.

16. The system of claim 8, wherein at least one computing node of the plurality of computing nodes comprises at least one processor that is configured to:
record a first configuration state of the first software application and the at least one second software application before the service request is processed to update the first software application;
record a second configuration state of the first software application and the at least one second software application after the service request is processed to update the first software application;
compare the first configuration state with the second configuration state to determine whether the update of the first software application was successful;
in response to determining that the update of the first software application has failed, record a reason for the failure; and
take one or more actions, based on the reason of the failure, to avoid the failure when processing a subsequent service request to update the first software application.

17. A non-transitory computer-readable medium storing instructions which when executed by a processor cause the processor to:
receive a service request to update a first software application of the plurality of software applications of the computing infrastructure;
identify one or more configuration items associated with updating the first software application;
determine a set of update activities to be performed to update the first software application;
verify the set of update activities to check whether each of the update activities can be performed in relation to the first software application;
identify at least one user that is to perform the set of update activities;
generate a request file at least including information relating to the one or more configuration items, the set of update activities, verified update activities from the set of update activities, and the at least one user;
generate a request block of a first blockchain network;
store the request file in the request block of the first blockchain network;
extract the request file from the request block of the first blockchain network;
identify one or more attributes relating to each of the identified configuration items;
generate a first version of a configuration file by adding information relating to the one or more attributes to the request file;
generate a first configuration block of a second blockchain network;
store the first version of the configuration file in the first configuration block of the second blockchain network;
extract the first version of the configuration file from the first configuration block of the second blockchain network;
for each of the configuration items, identify whether a conflicting service activity is requested for the configuration item that can interfere with updating the configuration item according to the service request;
generate a second version of the configuration file by adding, to the first version of the configuration file, information relating to whether the conflicting activity exists for each configuration item;
generate a second configuration block of the second blockchain network;

store the second version of the configuration file in the second configuration block of the second blockchain network;

validate access credentials of the at least one user that is to perform the set of update activities; and generate at least one file that includes information relating to one or more of the verified set of update activities, the at least one user, the identified configuration items, whether a conflicting service activity exists for each configuration item and validated access credentials of the at least one user, wherein the service request is processed according to the information in the at least one file to update the first software application.

18. The non-transitory computer-readable medium of claim 17, wherein the instructions further cause the processor to:

receive the service request to update the first software application at the first blockchain network;

identify at least one second software application that is to be updated to implement the requested update of the first software application;

determine one or more update activities to be performed to update the at least one second software application, wherein the one or more update activities is part of the set of update activities;

generate a first version of a request file including information relating to the identified at least one software application and the one or more update activities;

generate a first block of the first blockchain network including the first version of the request file; and add the first block to a blockchain of the first blockchain network.

19. The non-transitory computer-readable medium of claim 18, wherein the instructions further cause the processor to:

extract the first version of the request file from the first block;

verify the one or more update activities to be performed to update the at least one second software application;

generate a second version of the request file by adding the verified one or more update activities to the first version of the request file;

generate a second block of the first blockchain network including the second version of the request file; and add the second block to the blockchain of the first blockchain network.

20. The non-transitory computer-readable medium of claim 19, wherein the instructions further cause the processor to:

extract the second version of the request file from the second block;

identify a user that is to perform the one or more update activities to update the at least one second software application;

generate a third version of the request file by adding information relating to the user to the second version of the request file; and generate a third block of the first blockchain network including the third version of the request file.

* * * * *